United States Patent Office 3,355,353
Patented Nov. 28, 1967

3,355,353
O,O-DIALKYL S-[2-HALO-1-(N-PHTHALIMIDO)ETH-YL] PHOSPHORODITHIOATES AND PHOSPHOROTHIOATES AS INSECTICIDES
Joel D. Jamison, Westminster, Del., assignor to Hercules Incorporated, a corporation of Delaware
No Drawing. Filed Mar. 21, 1966, Ser. No. 535,735
20 Claims. (Cl. 167—33)

This is a continuation-in-part of application Serial No. 417,516 filed December 10, 1964, now abandoned.

This invention relates to O,O-dialkyl S-(2-halo-1-phthalimidoethyl) phosphorodithioates and phosphorothioates and to insecticidal compositions containing the same.

In accordance with the parent application, O,O-dialkyl S-[2-halo-1-(N-phthalimido)ethyl]phosphorodithioates are toxicants, highly toxic to the southern army worm and plum curculio, which are produced by reacting N-(1,2-dihaloethyl) phthalimide with a salt of an O,O-dialkyldithiophosphate.

In acordance with the present invention, it has now been found that O,O-dialkyl S-[2-halo-1-(N-phthalimido)ethyl] phosphorothioates are likewise highly toxic to the southern army worm and are prepared by reacting N-(1,2-dihaloethyl) phthalimide with a salt of an O,O-dialkyl phosphorothioate.

The compounds of this invention have the general formula:

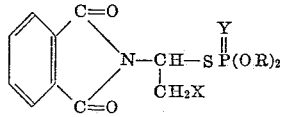

where X is halogen, Y is O or S and R is methyl or ethyl. These compounds are broadly referred to as O,O-dialkyl S-[2-halo - 1 - (N-phthalimido)ethyl] phosphorothioates and O,O-dialkyl S-[2-halo - 1 - (N-phthalimido)ethyl] phosphorodithioates.

Following are examples illustrative of the method of preparing the compounds of this invention and of the manner of using them. All parts and percentages are by weight.

Example 1

To a solution of 50 parts N-(1,2-dibromoethyl) phthalimide in 320 parts acetonitrile was added 26.2 parts ammonium dimethyldithiophosphate at 30° C. with stirring over an 18-hour period. The mixture was then heated at 50–60° C. for 2 hours. Temperatures as high as 100° C. can also be used. The ammonium bromide which settled was removed. The acetonitrile was distilled off, benzene was added in its place, and the solution was washed first with 5% sodium bicarbonate solution, then with water, and dried. The benzene was distilled off so as to recover 56.3 parts O,O-dimethyl S-[2-bromo-1-(N-phthalimido) ethyl] phosphorodithioate, a sample of which analyzed 20.07% Br and 7.04% P before crystallization and 19.89% Br and 7.27% P after crystallization to M.P. 102–103° C. from a toluene-petroleum ether mixture.

Example 2

Following the procedure of Example 1, a 97% conversion of N-(1,2-dibromoethyl) phthalimide to O,O-diethyl S-[2-bromo-1-(N-phthalimido)ethyl] phosphorodithioate was obtained. This diethyl ester analyzed 17.54% Br and 6.94% P before crystallization and 17.9% Br and 6.49% P after crystallization from a toluene-petroleum ether mixture to a melting point of 73–74° C.

Example 3

A solution of 4.4 parts dimethyldithiophosphoric acid in 50 parts benzene containing 0.1 part of zinc chloride was heated to 70–80° C. for 30 minutes and cooled. Then 5.9 parts N-(1,2-dichloroethyl) phthalimide was added and the mixture was heated to reflux (75–80° C.) for 3 hours with provision for HCl evolution. The resulting solution was diluted with an equal volume of benzene and washed first with 10% aqueous hydrochloric acid, then with 5% aqueous sodium bicarbonate solution, again with hydrochloric acid solution and finally with brine, and dried. The benzene was distilled off to recover as residue 8.7 parts of O,O-dimethyl S-[2-chloro-1-(N-phthalimido) ethyl] phosphorodithioate, M.P. 76–77° C., after crystallization from a toluene-hexane mixture.

Example 4

To a solution of 61 parts of N-(1,2-dichloroethyl) phthalimide in 390 parts acetonitrile was added 56 parts ammonium diethyldithiophosphate while stirring at about 25° C. After the initial reaction appeared to be complete, the mixture was heated to 50° C. for 2 hours, and it was then cooled and filtered. The acetonitrile was removed, and benzene was used in its place. The benzene solution was washed neutral and free of water-soluble materials. The benzene was evaporated to obtain 82 parts of O,O-diethyl S-[2-chloro-1-(N-phthalimido)ethyl] phosphorodithioate as a viscous oil, a portion of which, after crystallization from a toluene-hexane mixture, melted at 62–64° C.

Example 5

O,O-diethyl sodium phosphorothioate was prepared by adding 20.7 parts diethyl hydrogen phosphite to a solution of sodium ethoxide from 3.5 parts sodium in 74 parts ethanol, stirring for 15 minutes and adding 4.8 parts sulfur (powdered) gradually at 30° C. and then stirring for 15 minutes. To this solution of diethyl sodium phosphorothioate was added 24.4 parts N-(1,2-dichloroethyl) phthalimide and the mixture was stirred for 48 hours at 24° C. and finally for 5 hours at 50–60° C. The sodium chloride which separated was removed by filtration and the alcohol solvent was distilled off. The residue was taken up in benzene and washed with aqueous 5% NaHCO₃, with aqueous 10% HCl, and then with water. After drying, the benzene was removed to recover as 31.2 parts yellow oil O,O-diethyl S-[2-chloro-1-(N-phthalimido)ethyl] phosphorothioate which analyzed P, 7.1%; S, 9.8%.

Example 6

The triethylamine salt of O,O-diethyl S-(hydrogen phosphorothioate) was prepared by adding 5.05 parts triethylamine in 3.9 parts acetonitrile dropwise to 6.9 parts diethyl hydrogen phosphite in 7.8 parts acetonitrile and then adding 1.6 parts powdered sulfur and stirring all while maintaining a temperature in the range of 25–35° C. After 30 minutes, 8.32 parts N(1,2-dibromoethyl) phthalimide was added with stirring at about 24° C. and after 30 minutes the mixture was heated at 50° for one hour. The resulting reaction mixture was poured into water, extracted with benzene, and the benzene extract was washed with 5% sodium bicarbonate and then with water. The benzene solution was dried and the solvents were distilled off under reduced pressure up to 60° C. The resulting O,O-diethyl S-[2-bromo-1-(N-phthalimido) ethyl] phosphorothioate was recovered as a viscous tan liquid amounting to 8.9 parts which analyzed 17.5% Br and 9.5% S and obviously contained some dissolved elemental sulfur. The product was shown to contain the imide group and the ≡P(OC₂H₅)₂ group by infrared spectrum in which bands appeared at 5.6, 5.8, 9.5–10, and 10.2–10.4 mµ.

O,O-dimethyl S-[2-halo-1 - (N - phthalimido) - ethyl] phosphorothioates are best made by reacting O,O-dimethyl S-(hydrogen phosphorothioate) with N(1,2-dihaloethyl) phthalimide using zinc chloride as a catalyst. In place of zinc chloride ferric chloride or stannic chloride may be used if desired. These methyl esters are equivalent in many respects to the methyl esters of the corresponding dithioates.

An emulsifiable concentrate was made from each of the toxicants of Examples 1, 2, 3, 4, 5 and 6 by dissolving 1.5 parts toxicant in 3 parts benzene and adding 3 parts Tween 20 (sorbitol monolaurate polyoxyethylene derivative). These concentrates are readily dispersible in water, and aqueous emulsions containing 0.025% toxicant, 0.01% toxicant and 0.005% toxicant were prepared by pouring the concentrates into water with stirring.

Using standard spraying equipment under standard conditions, these emulsions were sprayed on lima bean leaves (Woods Prolific) about 3 inches long, each held by its stem in a vial containing water. The leaf was in each case sprayed on each side 5 seconds and allowed to dry. The leaf was then placed in a small plastic box (34 cubic inches volume) with ten 3rd and 4th instar southern army worm larvae (*Prodenia eridania*) and held for 48 hours at 78–80° F. At the end of this period, the larvae exposed to the leaves sprayed with toxicant were counted and the percent dead or moribund determined.

The toxicity data are recorded below.

| No. | Compound[1] | | Concentration (percent) | Kill (percent) |
|---|---|---|---|---|
| | Halogen | Ester | | |
| 1 | Br | CH$_3$ | 0.025 | 80 |
| | | | 0.01 | 63 |
| | | | 0.005 | 0 |
| 2 | Br | C$_2$H$_5$ | 0.025 | 97 |
| | | | 0.01 | 63 |
| | | | 0.005 | 10 |
| 3 | Cl | CH$_3$ | 0.025 | 97 |
| | | | 0.01 | 23 |
| | | | 0.005 | 13 |
| 4 | Cl | C$_2$H$_5$ | 0.025 | 97 |
| | | | 0.01 | 30 |
| | | | 0.005 | 7 |
| 5 | Cl | C$_2$H$_5$ | 0.025 | 90 |
| | | | 0.01 | 30 |
| 6 | Br | C$_2$H$_5$ | 0.025 | 100 |

[1] See the following table:

| No. | Compounds |
|---|---|
| 1 | O,O-dimethyl S-[1-(N-phthalimido)-2-bromoethyl] phosphorodithioate. |
| 2 | O,O-diethyl S-[1-(N-phthalimido)-2-bromoethyl] phosphorodithioate. |
| 3 | O,O-dimethyl S-[1-(N-phthalimido)-2-chloroethyl] phosphorodithioate. |
| 4 | O,O-diethyl S-[1-(N-phthalimido)-2-chloroethyl] phosphorodithioate. |
| 5 | O,O-diethyl S-[1-(N-phthalimido)-2-chloroethyl] phosphorothioate. |
| 6 | O,O-diethyl S-[1-(N-phthalimido)-2-bromoethyl] phosphorothioate. |

The compound corresponding to 1 and 3, but without the halomethyl group gave a kill of only 23% at 0.25% concentration when tested in the same way at the same time.

For testing toxicity to Plum curculio, similar emulsions were sprayed on small green apples suspended by wire so as to accomplish complete coverage. The apple surface was then dried by evaporation and the apples were exposed to 10 adult curculio (*Conotrachelus nenuphar* (Herbst)) at 78–80°F. Six days later, the mortality was determined.

The toxicity data, which is the average of three replicates, are recorded below.

| No. | Compound | | Concentration (percent) | Kill (percent) |
|---|---|---|---|---|
| | Halogen | Ester | | |
| 1 | Br | CH$_3$ | 0.025 | 100 |
| | | | 0.01 | 70 |
| | | | 0.005 | 27 |
| 3 | Cl | CH$_3$ | 0.025 | 100 |
| | | | 0.01 | 100 |
| | | | 0.005 | 93 |

The methyl esters (compounds No. 1 and 3) are preferred to the ethyl esters as toxicants since they have only a fraction of the toxicity to warm-blooded animals of the ethyl esters.

Besides being useful as an insecticide, the O,O-dialkyl S-[2-bromo-1-(N - phthalimido)ethyl] phosphorodithioates and phosphorothioates are useful as intermediates in the preparation of related insecticides in which —SCN,

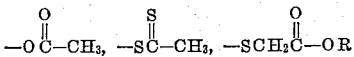

—OR, and —NR$_2$, where R is a 1–3 C hydrocarbon radical, is substituted for the bromine.

The compounds of this invention may be used in the impure state or in a purified state as an intermediate for the preparation of a series of compounds by reaction with various salts whereby the bromine is replaced by other groups. The compounds may also be used in the impure state or in the purified state as essential components of toxic compositions for control of southern army worms. The compositions which are so used are dispersible compositions. A dispersible composition of this type is a concentrate of the O,O-dialkyl S-[2-halo-1-(N-phthalimido)ethyl] phosphorodithioate or phosphorothioate and an effective amount of a dispersing agent. In the case of a solid dispersible composition, the dispersing agent may be a finely divided dispersible inert solid such as is well known in the insecticide art, a typical dispersible solid of this type being a clay. A concentrate will contain 10–50% of the active toxicant and 50–90% dispersing agent. In the case of a liquid dispersible composition, the dispersing agent will be an effective amount of one or more emulsifying agents. Liquid dispersible compositions for conversion into aqueous emulsions will contain an emulsifying agent or an emulsifying composition of an emulsifying agent and an organic solvent. The solid dispersible compositions may also be water dispersible, in which case the composition contains the toxicant, dispersible solid, and an emulsifying agent in an amount sufficient to bring about a stable dispersion of the toxicant and solid in water. A composition of this type is the well-known dispersible powder.

Suitable dispersing and emulsifying agents are well known in the art and many are disclosed in Frear, Chemistry of Insecticides, Fungicides and Herbicides, sec. ed. (1948). Suitable solid dispersing agents include talc, attapulgite, pyrophylite, diatomaceous earth, kaolin, aluminum and magnesium silicates, montmorillonite, fuller's earth and their equivalents.

The preferred compositions are those in which water is used as the major component and the compound of this invention is a minor component. Such aqueous dispersions are usually prepared in the field so as to have a content of 0.5 to 10% of the active compound by dispersing a concentrate made up from about 10 to about 90% active compound, about 0.5 to 10% dispersing agent, and 0 to 90% inert diluent. Dispersing agents which are useful in such concentrates are the well-known surface active agents of the anionic, cationic or non-ionic type and include alkali metal (sodium or potassium) oleates and similar soaps, amine salts of long chain fatty acids (oleates), sulfonated animal and vegetable oils (fish oils and castor oil), sulfonated petroleum oils, sulfonated acylic hydrocarbons, sodium salts of lignin sulfonic acids, alkylnaphthalene sodium sulfonates, sodium lauryl sulfonate, disodium monolaurylphosphates, sorbitol laurate, pentaerythritol monostearate, glycerol monostearate, polyethylene oxides, ethylene oxide condensates of stearic acid, stearyl alcohol, stearyl amine, rosin amines, dehydroabietyl amine and the like, lauryl amine salts, dehydroabietyl amine salts, lauryl pyridinium bromide, stearyl trimethyl ammonium bromide, and cetyl dimethylbenzylammonium chloride. The aqueous dispersions may thus be made from the compounds themselves, from the compounds dissolved in water-soluble or water-insoluble solvent or from wettable dusts.

What I claim and desire to protect by Letters Patent is:

1. A compound of the group consisting of O,O-dialkyl S-[2-halo-1-(N-phthalimido)ethyl] phosphorthioate and O,O - dialkyl S - [2 - halo-1-(N-phthalimido)ethyl] phosphorodithioate wherein alkyl is methyl or ethyl and halo is bromo or chloro.

2. A phosphorothioate of claim 1 in which alkyl is methyl and halo is bromo.

3. A phosphorothioate of claim 1 in which alkyl is methyl and halo is chloro.

4. A phosphorothioate of claim 1 in which alkyl is ethyl and halo is bromo.

5. A phosphorothioate of claim 1 in which alkyl is ethyl and halo is chloro.

6. A phosphorodithioate of claim 1 in which alkyl is ethyl and halo is bromo.

7. A phosphorodithioate of claim 1 in which alkyl is ethyl and halo is chloro.

8. A phosphorodithioate of claim 1 in which alkyl is methyl and halo is bromo.

9. A phosphorodithioate of claim 1 in which alkyl is methyl and halo is chloro.

10. A composition toxic to southern army worm larvae comprising a compound of claim 1 in admixture with an inert finely divided dispersible solid.

11. A composition toxic to southern army worm larvae comprising a compound of claim 1 in admixture with an inert dispersible volatile liquid.

12. An emulsifiable concentrate dispersible in water comprising a compound of claim 1 and an effective amount of a dispersing agent.

13. An emulsifiable concentrate dispersible in water comprising a compound of claim 2 and an effective amount of a dispersing agent.

14. An emulsifiable concentrate dispersible in water comprising a compound of claim 3 and an effective amount of a dispersing agent.

15. An emulsifiable concentrate dispersible in water comprising a compound of claim 4 and an effective amount of a dispersing agent.

16. An emulsifiable concentrate dispersible in water comprising a compound of claim 5 and an effective amount of a dispersing agent.

17. An emulsifiable concentrate dispersible in water comprising a compound of claim 6 and an effective amount of a dispersing agent.

18. An emulsifiable concentrate dispersible in water comprising a compound of claim 7 and an effective amount of a dispersing agent.

19. An emulsifiable concentrate dispersible in water comprising a compound of claim 8 and an effective amount of a dispersing agent.

20. An emulsifiable concentrate dispersible in water comprising a compound of claim 9 and an effective amount of a dispersing agent.

References Cited

UNITED STATES PATENTS 2,767,194   10/1956   Fancher _____ 167—33

FOREIGN PATENTS 869,399   5/1961   Great Britain.

ALBERT T. MEYERS, *Primary Examiner.*

JULIAN S. LEVITT, *Examiner.*

J. GOLDBERG, *Assistant Examiner.*